US010606910B2

(12) United States Patent
Govindarajan et al.

(10) Patent No.: US 10,606,910 B2
(45) Date of Patent: Mar. 31, 2020

(54) RANKING SEARCH RESULTS USING MACHINE LEARNING BASED MODELS

(71) Applicant: salesforce.com, inc., San Francisco, CA (US)

(72) Inventors: Jayesh Govindarajan, Palo Alto, CA (US); Nicholas Beng Tek Geh, San Carlos, CA (US); Francisco Borges, Voorburg (NL); Ammar Haris, Lake Forest Park, WA (US)

(73) Assignee: salesforce.com, inc., San Francisco, CA (US)

( * ) Notice: Subject to any disclaimer, the term of this patent is extended or adjusted under 35 U.S.C. 154(b) by 126 days.

(21) Appl. No.: 15/730,591

(22) Filed: Oct. 11, 2017

(65) Prior Publication Data

US 2018/0101617 A1    Apr. 12, 2018

Related U.S. Application Data

(60) Provisional application No. 62/407,444, filed on Oct. 12, 2016, provisional application No. 62/408,003, filed on Oct. 13, 2016.

(51) Int. Cl.
*G06F 17/30* (2006.01)
*G06F 16/9535* (2019.01)
*H04L 29/08* (2006.01)
*G06N 20/00* (2019.01)

(52) U.S. Cl.
CPC ......... *G06F 16/9535* (2019.01); *G06N 20/00* (2019.01); *H04L 67/02* (2013.01); *H04L 67/306* (2013.01)

(58) Field of Classification Search
USPC .......................................................... 707/732
See application file for complete search history.

(56) References Cited

U.S. PATENT DOCUMENTS

| | | | | |
|---|---|---|---|---|
| 8,458,165 | B2* | 6/2013 | Liao ...................... | G06F 16/284 707/713 |
| 2011/0191316 | A1* | 8/2011 | Lai .......................... | G06F 16/00 707/706 |
| 2014/0250115 | A1* | 9/2014 | Yang ...................... | G06F 16/583 707/728 |
| 2015/0161202 | A1* | 6/2015 | Shapira ............... | G06F 16/2425 707/723 |
| 2017/0220575 | A1* | 8/2017 | Hohwald ............... | G06F 16/435 |

* cited by examiner

*Primary Examiner* — Kim T Nguyen
(74) *Attorney, Agent, or Firm* — Fenwick & West LLP

(57) ABSTRACT

An online system identifies and ranks records using multiple machine learning models in response to a search query. Therefore, the online system can provide selected records that are of the most relevance to a user of a client device that provided the search query. More specifically, the online system applies a first machine learning model that is of low complexity, such as a regression model. Therefore, the first machine learning model can quickly narrow down the large number of records of the online system to a first set of candidate records. The online system analyzes candidate records in the first set by applying a more complex, second machine learning model that more accurately determines records of interest for the user. In various embodiments, the online system can apply subsequent machine learning models of higher complexity for selecting and ranking records for provision to the client device.

20 Claims, 5 Drawing Sheets

RANKING SEARCH RESULTS USING MACHINE LEARNING BASED MODELS

CROSS REFERENCE TO RELATED APPLICATIONS

This application claims the benefit of U.S. Provisional Application No. 62/407,444 filed on Oct. 12, 2016 and U.S. Provisional Application No. 62/408,003 filed on Oct. 13, 2016, the contents of each of the above referenced applications incorporated by reference in their entirety.

TECHNICAL FIELD

This disclosure generally relates to ranking search results, and more specifically to the application of machine learning based models for ranking search results that can be provided in response to a search query.

BACKGROUND

Online systems often store large amount of data for enterprises. An online system may store data for a single enterprise or for multiple enterprises. For example, a multi-tenant system stores data for multiple tenants, each tenant potentially representing an enterprise. The data stored by an online system for an enterprise includes records representing various entities associated with the entity, for example, user accounts, tasks and projects, documents, communications between users, media objects, and so on. Users of such online systems encounter a common problem when searching for information. Online systems typically provide search functionality, for example, based on an enterprise search engine. Online systems aim to effectively identify and rank search results representing information that a user is searching for, so as to present the user with the most relevant information.

However, conventional techniques used by online systems for identifying and ranking search results are either slow because they are very computation intensive or present poor quality results. For example, some online systems do not process all relevant information to rank data and therefore provide poorly ranked search results even though these online systems return the search results to the user fast. Poorly ranked search results make it difficult for a user to find the relevant information since the user is forced to manually review all search results to identify the relevant ones. On the other hand, online systems that consider all relevant information for ranking search results require significant computational resources, especially given the large amount of data stored by online systems. Therefore, conventional techniques for ranking search results are either very computationally intensive and therefore slow, or they provide poorly ranked search results, thereby providing a poor user experience.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1A:
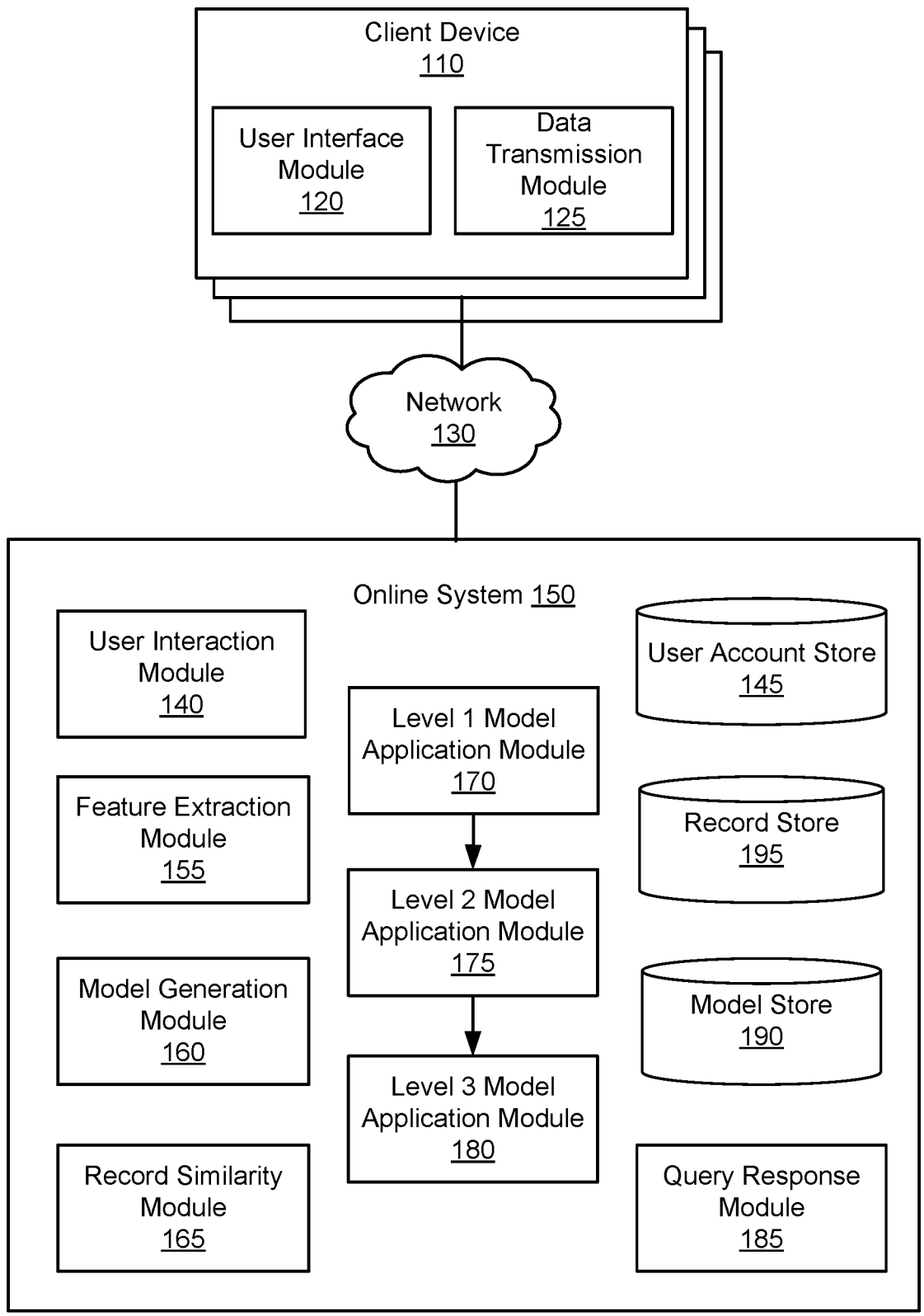
FIG. 1A depicts an overall system environment for providing search results in response to a search query, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "service 115A," indicates that the text refers specifically to the element having that particular reference numeral. A reference numeral in the text without a following letter, such as "service 115," refers to any or all of the elements in the figures bearing that reference numeral (e.g. "service 115" in the text refers to any one or combination of reference numerals "service 115A," "service 115B," or "service 115C" in the figures).

Overall System Environment

FIG. 1A depicts an overall system environment 100 for providing records in response to a search query, in accordance with a first embodiment. The overall system environment 100 can include one or more client devices 110 and an online system 150. In some embodiments, additional or fewer devices and/or systems are present in the system environment 100. For example, although the embodiment depicted in FIG. 1 shows three client devices 110, in other embodiments the environment 100 may include other numbers of client devices 110. As another example, different modules within the online system may be executed as separate systems or servers.

In one embodiment, the user interaction module 140 and the user account store 145 may execute as separate server in the system environment 100 and provide information pertaining to users, to the online system 150. In this embodiment, an enterprise may operate the online system 150 to provide enterprise search functionality and facilitate user interactions between users of the online system 150. In this scenario, users of the online system 150 can create and access records of the online system 150.

Generally, a client device 110 provides a search query to an online system 150 and in response to the search query, the online system 150 analyzes available records and returns, to the client device 110, selected search results and ranking information corresponding to the selected search results. As used hereafter, selected search results refers to a subset of records selected from the records stored by the online system 150. Examples of a record can be information about a contact (e.g., name, contact information), a communication record (e.g., an email, text, phone call, video call), or a data record (e.g., a file, a document, or an executable application). For example, a record can include the content of a document as well as metadata describing the document. The metadata can describe one or more users associated with the document, the last modified date of the document, the creation date of the document, and so on.

The online system 150 applies multiple models to identify records stored in the online system 150 that are likely to be of interest to the user. In one embodiment, the online system 150 applies the multiple models in a successive manner. For example, a first model can analyze available records stored in the online system 150 and output a first set of candidate search results. The identified candidate set of search results can be further analyzed by a second model which outputs a second set of candidate search results. The second set of candidate search results represents a subset of search results in the first set of candidate search results. Thus, through the application of multiple models, the online system 150 whittles down the records stored in the online system 150 to select a set of search results to be provided to the client device 110.

Generally, the online system 150 successively applies models that are of increasingly complexity. In other words, a first model that analyzes a large number of records is of the lowest complexity and therefore, consumes a small amount of computational resources to analyze each record. A second model can be of higher complexity in comparison to the first model and therefore, consumes more computational resources to more accurately analyze each record.

Each model can be designed to analyze different features. For example, a model can consider features that describe how popular a record is (e.g., number of views). As other examples, a model can analyze features that are associated with a user that provided the search query, features that are associated with the search query, of features associated with the content of the record. Altogether, the online system 150 selects records based on the analysis of the multiple models and further generates a ranking of the selected records. The online system 150 provides a query response that includes the selected records and the ranking of the selected records to the client device 110 in response to the search query.

Network

The network 130 facilitates communications between the client device 110 and the online system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Client Device

The client device 110 may be an electronic device such as a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc.

The client device 110 may execute instructions (e.g., computer code) stored on a computer-readable storage medium. The client device 110 may include one or more executable applications, such as a web browser, to interact with services and/or content provided by the online system 150. In another scenario, the executable application may be a particular application designed by the online system 150 and locally installed on the client device 110. In one scenario, a user of the client device 110 may register with the online system 150 using a user identifier and password.

Generally, a client device 110 enables a user to provide search queries to the online system 150 and allows the user to access records that are stored by the online system 150. In some embodiments, a client device 110 communicates on behalf of the user with the user interaction module 140. In doing so, a user can interact with other users of the online system 150. Referring to the modules of the client device 110, the client device 110 includes a user interface module 120 and a data transmission module 125 for enabling these functions.

The user interface module 120 may be an interface that receives user inputs from a user. As one example, the user interface module 120 can communicate with a screen, such as a display screen or a touch screen. As another example, the user interface module 120 can communicate with a different input device such as a mouse or keyboard. Therefore, a user can provide user inputs that the user interface module 120 provides to the data transmission module 125. In one embodiment, the user interface module 120 receives user inputs that specify a search query. The search query can then be transmitted to the online system 150. In another embodiment, the user interface module 120 receives user inputs for interacting with other users of the online system 150. For example, such user inputs may be communications with another user of the online system 150 such as an email, text, phone call, instant message, video conference, and the like. These user communications are provided to the online system 150.

The user interface module 120 further organizes and presents data to the user. As an example, the user interface module 120 receives the search results selected by the online system 150 in response to search query. The user interface module 120 organizes the search results according to ranking information provided by the online system 150. The user interface module 120 provides the search results in their ranked order to a display screen for display to the user. As another example, the user interface module 120 presents user interactions from the online system 150 such as an email, text, phone call, instant message, and the like.

The data transmission module 125 provides data to the online system 150 on behalf of the user of the client device 110. In some embodiments, the data transmission module 125 provides a search query to the online system 150 that includes details such as a specification of a name, an entity, a title, a date (e.g., creation date of the record), or a record type. In various embodiments, a search query sent by the data transmission module 125 is further associated with information of the user. For example, information of the user can identify the user such as a user identifier, email address, name, and the like. Altogether, the details included in the search query and the information of the user associated with the search query enables the online system 150 to analyze and return search results that are most suited for the user.

In some embodiments, the data transmission module 125 provides user actions on behalf of the user to the online system 150. A user action can include an identification of a user of the client device 110, one or more identification corresponding to one or more additional users of the online system 150, and a payload of the user action. Specifically, if a user action is a user communication, such as an email, the user action includes an identification of the user sending the email, identifications of one or more users that the email is being sent to, and a message of the communication (e.g., payload of the user action). In another embodiment, the user action may be a request to access a record stored by the online system 150. Therefore, the user action provided by the data transmission module 125 can include an identification of the user of the client device 110 that is requesting access to a record, an identification of a user that provided the record, and an identification of the record (e.g., payload of the user action). Altogether, the user action provided by the data transmission module 125 to the online system 150 enable the online system 150 to identify users that are involved in the user action.

System Architecture of the Online System

Figure 1B:
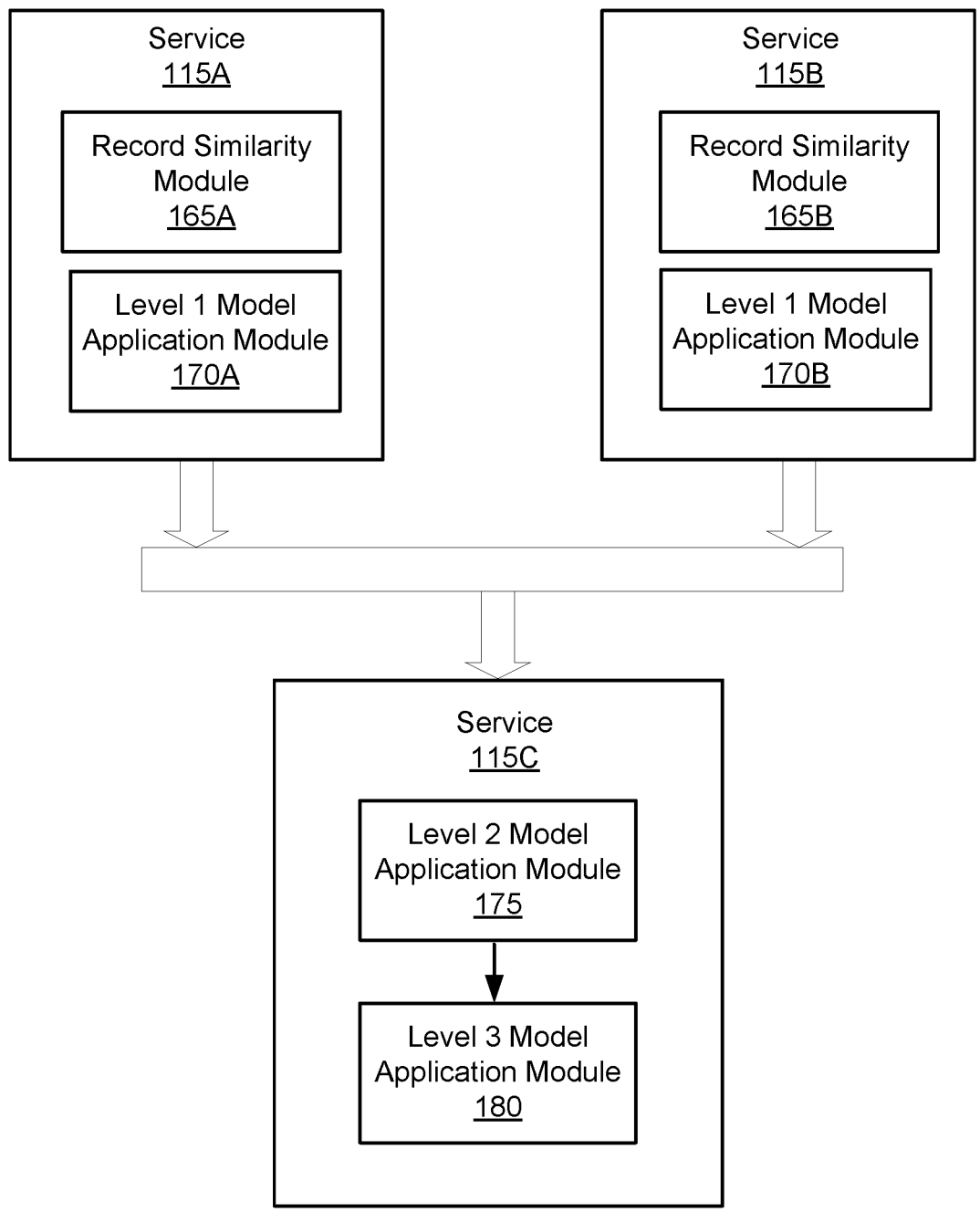
FIG. 1B depicts a distributed online system, in accordance with an embodiment.

The online system 150 is physically embodied as one or more electronic devices having computer functionality. In some embodiments, the functions performed by the online system 150 can be distributed across a cloud server or rack server. In other words, the functions and algorithms performed by the online system 150 can be distributed across multiple processors and/or electronic devices. Such an embodiment is shown in FIG. 1B, which depicts a distributed online system, in accordance with an embodiment. This embodiment shown in FIG. 1B is described in further detail below. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In general, the online system 150 receives search queries from client devices 110 and provides selected search results back to the client device 110 in response to the search query. More specifically, the online system 150 generates and trains multiple models that each analyze different sets of features. Thus, when a search query is received, the online system 150 applies the multiple models in a successive manner to narrow down the records to a final, selected set of search results. The online system 150 can provide the selected search results as well as ranking information of the selected search results to the client device 110. In an embodiment, the online system 150 provides the selected search results in order of the ranking to the client device 110. In another embodiment, the online system 150 uses the ranking to determine a subset of the selected search results and send the selected subset to the client device 110.

To perform these functions, the online system 150 includes a user interaction module 140, a user account store 145, a feature extraction module 155, a model generation module 160, a record similarity module 165, a level 1 model application module 170, a level 2 model application module 175, a level 3 model application module 180, and a query response module 185. In some embodiments, the online system 150 includes fewer or additional modules for performing these functions. As an example, as opposed to the three application modules (e.g., the level 1 model application module 170, the level 2 model application module 175, and the level 3 model application module 180) depicted in FIG. 1A, the online system 150 may include fewer (e.g., two) or additional model application modules that successively apply models for narrowing and ranking records of the online system 150.

The user interaction module 140 enables users of the online system 150 to interact with each other. In some embodiments, the user interaction module 140 receives user communications from the client device 110 and executes the communications such that the users involved in the communication are able to interact with one another. For example, the user interaction module 140 receives an email from the client device 110 and executes the appropriate application programming interfaces (APIs) such that users that are addressed the email can receive, view, and respond to the message of the email.

In various embodiments, the online system 150 stores information describing users and interactions between users of the online system 150 in a user account store 145. The user account store 145 stores representations of each user of the online system 150. For example, the user account store 145 may store nodes that each represent a user of the online system 150. Each node can further be associated with characteristics of the user of the online system 150. For example, each node can store a user's personal information such as the user's name, age, gender, demographic group, socioeconomic status, and the like.

Furthermore, the user account store 145 can include representations of interactions between two or more users. For example, the user account store 145 may include edges that each connect two nodes representing user accounts. Each edge represents an interaction between a first user represented by the first node and a second user represented by the second node. In some embodiments, the online system 150 can record additional information within the user account store that relates to interactions between two users. Such additional information can include a frequency of interaction between two or more users or a duration of interaction between two or more users.

Alternative Embodiment of the Online System

Reference is now made to FIG. 1B, which depicts a distributed online system 150, in accordance with an embodiment. In these embodiments, the one or more processors of the online system 150 and the functions performed by the processor-implemented modules of the online system 150 are distributed. As shown in FIG. 1B, the modules of the online system 150 are divided into a service 115A, a service 115B, and a service 115C. A service 115 may execute on a separate server/system or may be a process within a server executing various other modules. In some embodiments, the online system 150 may comprise other services 115D, 115E, and so on. FIG. 1B depicts one embodiment where record similarity modules 165A/B and level 1 model application modules 170A/B are distributed across the services 115A/B. Therefore, the functions performed by each of the record similarity modules 165A/B and level 1 model application modules 170A/B can be performed in parallel. This may be beneficial for the purposes of rapidly processing a large number of records stored by the online system 150. Thus, in the embodiment shown in FIG. 1B, each of the record similarity module 165A/B and level 1 model application module 170A/B of the service 115A/B can process records and provide the results of the processing to the service 115C. The level 2 model application module 175 in service 115C is applied to the results of the processing conducted by the level 1 model application modules 170A/B and provided by the distributed services 115A/B.

In other embodiments, the processor-implemented modules of the services 115A/115B/115C can be differently distributed. For example, instead of having the functions of the record similarity module 165A/B and level 1 model application module 170A/B distributed across the services 115A/115B, the functions of the level 2 model application module 175 and/or the functions of the level 3 model application module 180 can be distributed across services 115A/115B. Given the increased complexity of level 2 and level 3 models, distributing the functions performed by the level 2 model application module 175 and level 3 model application module 180 such that these records can be parallel processed across the services 115A/B can increase the overall speed at which the records are analyzed.

Generating and Training Machine Learning Models

Referring back to FIG. 1A, the feature extraction module 155 and the model generation module 160 perform the functions for generating and training the machine learning models. The trained machine learning models are stored in the model store 190 for later retrieval, such as when a search query is processed.

The feature extraction module 155 extracts features that are applied as input to each machine learning model for training the model. When training the machine learning models, the feature extraction module 155 extracts features from a training dataset that can include training records and training search queries.

As a first example, the feature extraction module 155 extracts popularity features of a record which can include the total number of views for the record, a total number of views over a threshold period of time, and a number of other records that are linked to the record. As a second example, the feature extraction module 155 extracts query features from a search query provided by the client device 110. Query features can include the time that the search query was sent, an identification of the user that is sending the query, or a word/phrase included in the query, examples of which include an entity, a record type, or a title of a record. As a third example, the feature extraction module 155 extracts record content features which can include a data type in the record (e.g., Boolean, string, integer), one or more text strings in the record, a creation time of the record, a number of updates to the record, or an update time of the record. As a fourth example, the feature extraction module 155 extracts features that relate to users, such as the user of the client device 110. These features are hereafter referred to as social features. In various embodiments, the feature extraction module 155 accesses the user account store 145 of the online system 150 to extract social features corresponding to the user of the client device 110. Examples of social features of a record can include characteristics of the user, such as personal information including name, age, gender, demographic group, socio-economic status, and the like. Other examples of social features can include a number of interactions between the user and other users. In various embodiments, social features can relate to both a user and a particular record. Specific examples of social features that relate to both a user and a record include an indication of an interaction between the user and an additional user that originally provided the record, a frequency of interaction between the user and an additional user that originally provided the record, and interactions between the user and additional users that are related to the record (i.e., an email communication between users that includes the record as an attachment). The feature extraction module 155 provides the extracted features to the model generation module 160 for training the multiple machine learning models.

The model generation module 160 generates and trains each machine learning model based on historical data. In an embodiment, each machine learning model receives a set of search results as input and generates a score indicative of each search result as output. Each input search result may be represented as a vector storing values of specific features of the input search result and identifying the record corresponding to the search result. Generally, each machine learning model may be one of a linear regression, logistic regression, neural network, support vector machine, decision tree, learning classifier, or Bayesian network. Therefore, the model generation module 160 may use different machine learning techniques to train a machine learning model including, but not limited to decision tree learning, association rule learning, artificial neural network learning, deep learning, support vector machines (SVM), cluster analysis, Bayesian algorithms, regression algorithms, instance-based algorithms, and regularization algorithms.

As described hereafter, the model generation module 160 generates three machine learning models, referred to as a level 1 model, level 2 model, and level 3 model. In other embodiments, fewer (e.g., level 1 and level 2 machine learning model) or additional models (e.g., four or more machine learning models) can be generated by the model generation module 160. In various embodiments, the model generation module 160 can generate multiple machine learning models of different computational complexities. For example, higher level models are of a higher computational complexity in comparison to lower level models. Generating, training, and executing a model of higher complexity consumes more computational resources in comparison to generating and training a model of lower complexity. Specifically, the generation, training, and execution of the level 1 model consumes fewer computational resources in comparison to the generation, training, and execution of either the level 2 or level 3 model. For example, the level 1 model may be a regression model, examples of which can be a linear, polynomial, or logistic regression model. The level 2 and level 3 models may each be a more complex model, such as a neural network, support vector machine, decision tree, learning classifier, or Bayesian network. In some embodiments, the generating, training, and execution of the level 3 model may consume more computational resources in comparison to the level 2 model. As one example, if the level 2 and level 3 models are neural networks, then the level 3 model can include more layers in comparison to the level 2 model.

Generally, when analyzing a record, each model is designed to receive one or more features as input. The model outputs a score for the record, the score indicating a relevance of the record for the user of the client device 110 that provided the search query. Returning to the level 1 model, in various embodiments, the model generation module 160 provides one or more popularity features as input to the level 1 model. Therefore, an example output of the level 1 model may be expressed as:

$$\text{First Score} = \alpha_1 x_1 + \alpha_2 x_2 + \ldots + \alpha_n x_n$$

wherein $x_n$ is an nth popularity feature and $\alpha_n$ is a weight assigned to the nth popularity feature. As the model generation module 160 trains the level 1 model across a training dataset, it adjusts the weight assigned to each popularity feature. For example, for a training example where a user accessed a target record, thereby indicating an interest in the target record, the model generation module 160 adjusts the weights of the popularity features of the target record such that the first score is higher to reflect the user interest.

Referring now to the level 2 model, the model generation module 160 provides one or more query features and one or more record content features as input to the level 2 model. In various embodiments, the model generation module 160 provides additional features to the level 2 model that are a combination of query features and record content features. As a specific example, the model generation module 160 generates an additional feature as the difference between a time that the search query was submitted (i.e. query feature) and a most recent time that the record was updated (i.e. record content feature). In various embodiments, the level 2 model can further receive social features. Altogether, the model generation module 160 trains the level 2 model across a training dataset.

In various embodiments, the model generation module 160 trains a level 2 model that is specific for an organization, for example, an enterprise that is a tenant of a multi-tenant system. An example of an organization can be a third party system such as a retailer, a company, an individual, or a group. In such embodiments, the model generation module 160 trains the level 2 model across training datasets that are specific for the organization. Training datasets specific for the organization can be provided to the online system 150 by the organization.

In other embodiments, the model generation module 160 trains a level 2 model that is specific for an entity type. An example of an entity type is the type of record, for example, a data record comprising a document, a user account, or an opportunity record storing information describing a potential transaction. In such embodiments, the model generation module 160 trains the level 2 model across training datasets that are specific for the entity type. In some embodiments, the training datasets are provided by the entity.

Referring now to the level 3 model, the model generation module 160 provides one or more social features as input to the level 3 model. The model generation module 160 trains the level 3 model across a training dataset. In various embodiments, the level 3 model is trained for a group of users. For example, a group of users can share a common characteristic which can be personal information of the users such as age range, a demographic group, a socio-economic status, or gender. Other examples of a characteristic of a group of users can be a common organization that the group of users is associated with (e.g., employees of an organization or fans of an organization) or a common professional title (e.g., chief executive officer, chief technology officer, manager, and the like) of users in the group. In such embodiments, the model generation module 160 trains the level 3 model across training datasets that are specific for the characteristic of the group of users.

The above description provides one embodiment in which particular features are provided as input to each of the level 1, level 2, and level 3 models. In other embodiments, the level 1 model can additionally or alternatively receive, as input, one or more of query features, record content features, and social features. In some embodiments, the level 2 model can additionally or alternatively receive, as input, one or more of popularity features and social features. In some embodiments, the level 3 model can additionally or alternatively receive, as input, one or more of popularity features, query features, or record content features.

In some embodiments, each of the level 2 and level 3 models can further receive, as input, features corresponding to results outputted by the lower level models. For example, the level 2 model can receive, as an input, a feature describing a ranking of the search results that were selected as a result of the analysis by the level 1 model. Additionally, the level 3 model can receive, as input, a feature describing a ranking of the search results that were selected as a result of the analysis by either the level 1 model or the level 2 model. In these embodiments, each of the level 2 and level 3 models can consider the analysis of lower level models. In other embodiments, each higher level model analyzes the search results independent of the analysis of lower level models.

In various embodiments, the level 1, level 2, and level 3 models are trained independently from one another. Therefore, each model can be trained on a separate training dataset. In these embodiments, the feature extraction module 155 extracts popularity features from a training dataset corresponding to the level 1 model, query features and record content features from a training dataset corresponding to the level 2 model, and social features from a training dataset corresponding to the level 3 model. The model generation module 160 trains each model using the corresponding extracted features and output labels of each corresponding training dataset.

In other embodiments, the level 1, level 2, and level 3 models are trained using the same training dataset. In these embodiments, the feature extraction module 155 extracts popularity features, query features, record content features, and social features from the training dataset and the model generation module 160 trains each of the level 1, level 2, and level 3 models using the output labels of the training dataset.

Applying Machine Learning Models for Identifying and Ranking Records

The online system 150 applies multiple machine learning models for identifying and ranking records and then provides the identified records and ranking information of the records to a client device 110. Generally, the online system 150 performs the steps of identifying and ranking records in response to a search query provided by the client device 110. Therefore, a user of the client device 110 can access a relevant, ranked list of records. Referring to FIG. 1A, the feature extraction module 155, record similarity module 165, level 1 model application module 170, level 2 model application module 175, level 3 model application module 180, and query response module 185 perform the functions of identifying, ranking, and providing selected search results to a client device 110 in response to a search query. Generally, the record similarity module 165 performs a first similarity analysis on a large number of records in the record store 195 to identify a set of relevant search results that satisfy a search criteria of the search query. The feature extraction module 155 extracts features from these relevant search results that each of the level 1 model application module 170, level 2 model application module 175, and level 3 model application module 180 provide as input to their respective machine learning models. In doing so, the online system 150 successively narrows down records to a set of selected search results that the query response module 185 provides to the client device 110 in response to the search query.

Figure 2:
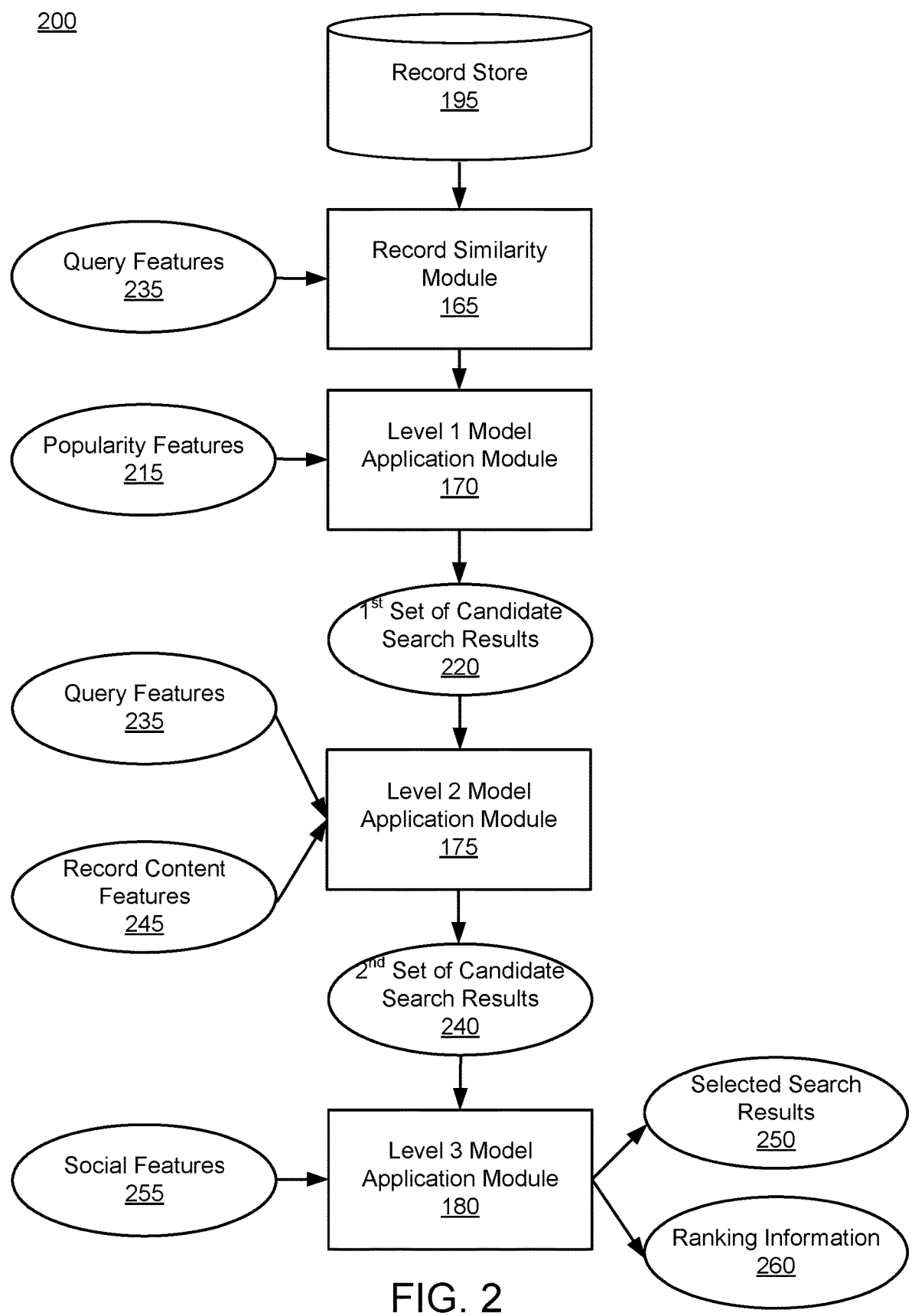
FIG. 2 depicts a block diagram flow process including the application of multiple models for selecting records, in accordance with an embodiment.

The feature extraction module 155 extracts features that can be used by each of the record similarity module 165, level 1 model application module 170, level 2 model application module 175, and level 3 model application module 180. Reference is now made to FIG. 2, which depicts a block diagram flow process including the application of multiple models for selecting search results, in accordance with an embodiment. In various embodiments, the feature extraction module 155 extracts query features 235 from a search query and provides the query features 235 to the record similarity module 165. The record similarity module 165 can use the query features 235 to identify search results relevant to the search query.

The feature extraction module 155 accesses records from the record store 195 and for each accessed record, extracts popularity features 215 of the record. In one embodiment, the feature extraction module 155 accesses and extract popularity features 215 from records from the record store 195 that the record similarity module 165 has identified as relevant search results. The functions performed by the record similarity module 165 are described below. Additionally, the feature extraction module 155 extracts record content features 245 from records in the record store 195. In various embodiments, the feature extraction module 155 extracts record content features 245 from records that are categorized in the $1^{st}$ set of candidate search results 220. Additionally, the feature extraction module 155 extracts social features 255 by accessing the user account store 145 of the online system 150. In various embodiments, the feature extraction module 155 extracts social features 255 that are related to records that are categorized in the $2^{nd}$ set of candidate search results 240 and related to the user of the client device 110 that provided the search query.

In various embodiments, the feature extraction module 155 provides the extracted popularity features for each record to the level 1 model application module 170 such that the extracted popularity features can be provided as input to a level 1 model. In various embodiments, the feature extraction module 155 provides the extracted query features and the extracted record content features to the level 2 model application module 175 such that the extracted query features and extracted record content features can be provided as input to a level 2 model. In various embodiments, the feature extraction module 155 provides the extracted social features to the level 3 model application module 180 such that the extracted social features can be provided as input to a level 3 model. In some embodiments, the feature extraction module 155 provides each of popularity features, query features, record content features, and social features to each of the level 1 model application module 170, level 2 model application module 175, and level 3 model application module 180 such that each of the application modules 170, 175, and 180 can apply the appropriate features as input to the corresponding machine learning module.

Referring to the record similarity module 165, it analyzes the large number of records in the record store 195 and identifies a set of relevant search results from the record store 195 that have a threshold level of similarity to the search query. Specifically, the record similarity module 165 considers the one or more query features 235 of the search query and calculates a numerical statistic for each record in the record store 195 that is representative of a level of similarity between the record and the search query.

An example of a numerical statistic calculated by the record similarity module 165 is a term frequency-inverse document frequency (TF-IDF) of one or more words that are included in the search query and the record. Therefore, records in the record store 195 that include multiple occurrences of one or more words that are specified by the search query can be assigned a high level of similarity whereas records in the record store 195 that do not include words specified by the search query can be assigned a low level of similarity. The record similarity module 165 identifies a set of relevant search results, where each relevant record in the identified set of relevant search results is assigned a level of similarity that is above a threshold level of similarity. In some embodiments, the record similarity module 165 ranks the records based on their levels of similarities and includes a threshold number of the highest ranking records in the identified set of relevant records.

The level 1 model application module 170 analyzes the relevant search results identified by the record similarity module 165 and generates scores for the relevant records such that relevant search results can be narrowed down into a $1^{st}$ set of candidate search results 220. In various embodiments, the level 1 model application module 170 retrieves a level 1 model from the model store 190 and applies the level 1 model to popularity features of each relevant search result.

As stated above, the level 1 model may be a model of low computational complexity (e.g., a regression model such as a linear, polynomial, or logistic regression). Therefore, the level 1 model can be applied to a large number of records, given that fewer computational resources are consumed by applying a level 1 model of low computational complexity as opposed to applying a more complex model (e.g., level 2 or level 3 model) to a large number of records.

The level 1 model outputs a score for each relevant record by analyzing the popularity features 215 of the relevant record. In various embodiments, the level 1 model application module 170 ranks the relevant search results based on the score of each relevant search result outputted by the level 1 model. A threshold number of the top ranking search results are included in the $1^{st}$ set of candidate search results. In another embodiment, all search results associated with an outputted score that is above a threshold score are included in the $1^{st}$ set of candidate search results. The level 1 model application module 170 provides the $1^{st}$ set of candidate search results 220 to the level 2 model application module 175. In various embodiments, the level 1 model application module 170 further provides the ranking of the search results in the $1^{st}$ set of candidate search results 220 to the level 2 model application module 175 such that the rankings can be further considered by the level 2 model as an additional feature.

The $1^{st}$ set of candidate search results 220 are analyzed by the level 2 model application module 175 to generate a $2^{nd}$ set of candidate search results 240. The $2^{nd}$ set of candidate search results 240 represents a subset of search results in the $1^{st}$ set of candidate search results 220. Specifically, the level 2 model application module 175 retrieves a level 2 model from the model store 190. In one embodiment, the level 2 model application module 175 analyzes the query features 235 to identify an entity specified by the search query. Therefore, the level 2 model application module 175 can retrieve the appropriate level 2 model that was previously trained for the entity.

For each record in the $1^{st}$ set of candidate records, the level 2 model application module 175 provides query features 235 and record content features 245 of the record as input to the level 2 model. As stated above, the level 2 model may be more complex than the level 1 model. Altogether, the application of the level 2 model on the features of a search result consumes additional computational resources in comparison to the application of the level 1 model on the features of a search result. Of note, the level 2 model analyzes fewer search result (e.g., records in the $1^{st}$ set of candidate search results) in comparison to the level 1 model that analyzes a larger number of search results (e.g., a set of relevant search results).

The level 2 model outputs a score for each search result of the 1$^{st}$ set of candidate search results 220 based on the query features 235 and record content features 245 of the search result. In various embodiments, the level 2 model application module 175 ranks the search result in the 1$^{st}$ set of candidate search results 220 based on the score of each search result outputted by the level 2 model. A threshold number of top ranking search results are included in the 2$^{nd}$ set of candidate search results 240. In another embodiment, all search results of the 1$^{st}$ set of candidate search results 220 that are associated with an outputted score that is above a threshold score are included in the 2$^{nd}$ set of candidate search results 240.

The level 2 model application module 175 provides the 2$^{nd}$ set of candidate search results 240 to the level 3 model application module 180. In various embodiments, the level 2 model application module 175 further provides the ranking of the search results in the 2$^{nd}$ set of candidate search results 240 to the level 3 model application module 180 such that the rankings can be further considered by the level 3 model as an additional feature.

The 2$^{nd}$ set of candidate search results 240 are analyzed by the level 3 model application module 180 to generate the selected search results 250 and ranking information 260 for the selected search results 250. Generally, the selected search results 250 represents a subset of search results in the 2$^{nd}$ set of candidate search results 240. Additionally, the ranking information 260 specifies an order of presentation of the selected search results 250 when provided to the client device 110.

The level 3 model application module 180 retrieves a level 3 model from the model store 190. In one embodiment, the level 3 model application module 180 analyzes the social features 255 to identify a characteristic of the user that submitted the search query. Therefore, the level 3 model application module 180 can retrieve the appropriate level 3 model that was previously trained for the characteristic.

As stated above, the level 3 model may be more complex than the level 1 model. In various embodiments, the level 3 model is also more complex than the level 2 model. Therefore, the application of the level 3 model on the features of a record consumes additional computational resources in comparison to the application of the level 1 model or the application of the level 2 model on the features of the record. Generally, the level 3 model analyzes fewer search results (e.g., records in the 2$^{nd}$ set of candidate search results 240) in comparison to the level 1 model and the level 2 model that each analyze a larger number of search results (e.g., a set of records in the record store 195 and records in the 1$^{st}$ set of candidate search results 220, respectively).

For each search result in the 2$^{nd}$ set of candidate search results 240, the level 3 model application module 180 provides social features 255 of the search result as input to the level 3 model. The level 3 model outputs a score for each search result of the 2$^{nd}$ set of candidate search results 240 based on the social features 255 of the search result. In various embodiments, the level 3 model application module 180 ranks the search results in the 2$^{nd}$ set of candidate search results 240 based on the score of each search result outputted by the level 2 model. A threshold number of top ranking search results are identified as the selected search results 250. In another embodiment, all search results of the 2$^{nd}$ set of candidate search results 240 that are associated with an outputted score that is above a threshold score are identified as selected search results 250. The level 3 model application module 180 further retains the ranking of the search results that are included as the selected search results 250. The ranking of the records serve as the ranking information 260.

Returning to FIG. 1A, the level 3 model application module 180 provides the selected search results 250 and the ranking information 260 to the query response module 185. The query response module 185 configures a query response and provides the query response to the client device 110. In various embodiments, the query response includes indications of the selected search results 250. For example, an indication of a selected record 250 can be a link, such as a uniform resource locator (URL). Therefore, when the indication of the selected record 250 is selected, the selected record 250 itself can be provided to the client device 110. In other embodiments, the query response includes the selected search results 250 themselves and therefore, the client device 110 can display the selected search results 250 without having to further interact with the online system 150.

In various embodiments, the query response configured by the query response module 185 includes instructions describing how the selected search results 250 or the indications of the selected search results 250 are to be displayed by the client device 110. For example, the query response can include the ranking information 260 of the selected search results 250. Therefore, the instructions of the query response can specify the order in which the indications of the selected search results 250 or the selected search results 250 are to be presented based on the ranking information 260.

Process for Identifying and Providing Records for a Search Query

Figure 3A:
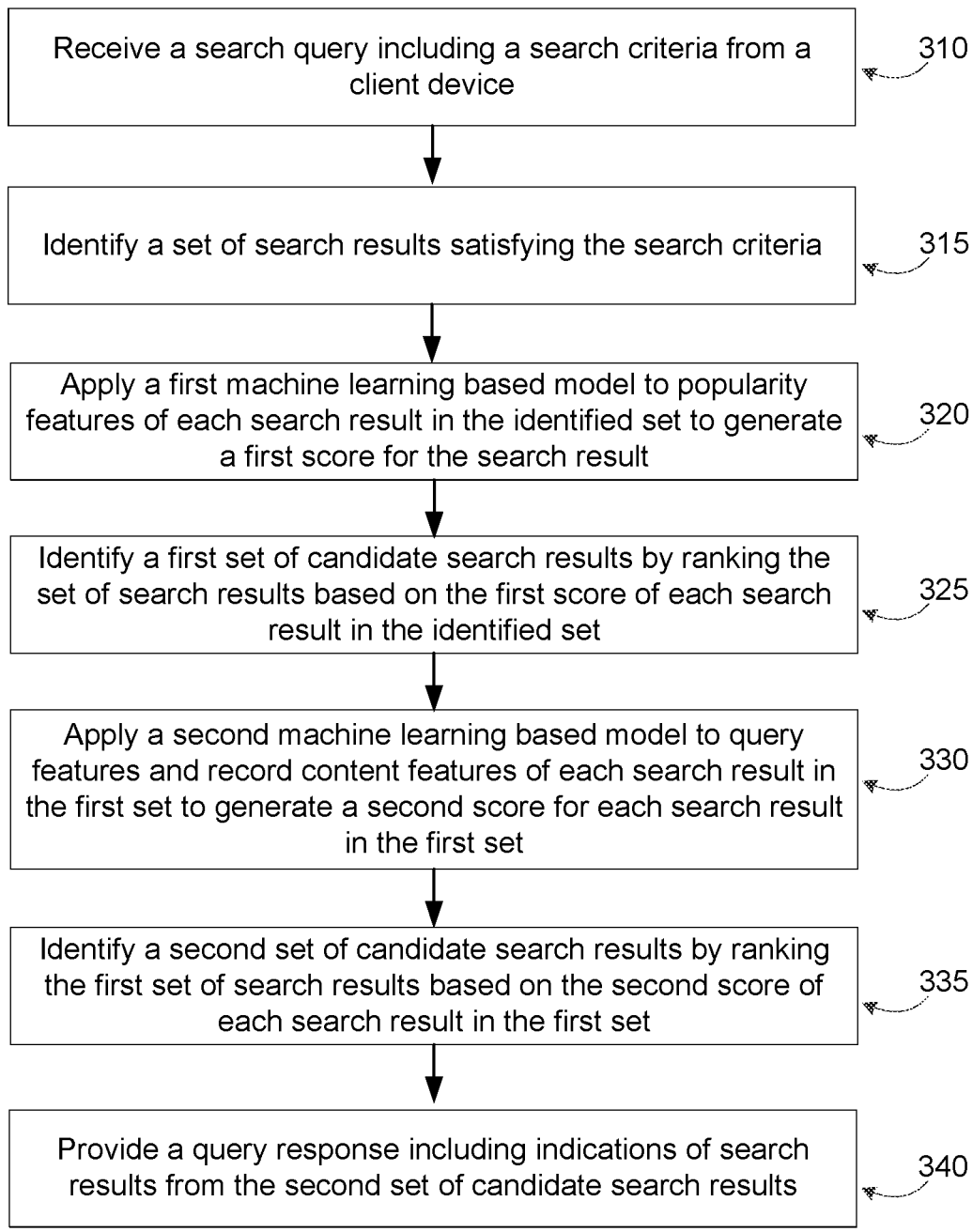
FIG. 3A depicts an overall flow process for providing ranked search results in response to a search query, in accordance with an embodiment.

FIG. 3A depicts an overall flow process for providing a query response with selected search results in response to a search query, in accordance with an embodiment. The online system 150 receives 310 a search query from a client device 110. The search query can include a search criteria. The online system 150 identifies 315 a set of search results that satisfy the search criteria of the search query. As an example, the online system 150 performs a TF-IDF analysis across the records of the online system 150 based on one or more words that are included in the search query.

The online system 150 applies 320 a first machine learning based model, such as a level 1 model, to popularity features 215 of each search result in the identified set of search results. The first model outputs a first score for each search result. Based on the first score for each search result, the online system 150 identifies 325 a first set of candidate search results 220. The search results in the first set of candidate search results 220 represent a subset of search results in the identified set of search results.

The online system 150 further applies 330 a second machine learning based model, such as a level 2 model, to query features 235 and record content features 245 of each search result in the first set of candidate search results 220. The second model outputs a second score for each search result in the first set of candidate search results 220. Based on the second score for each search result, the online system 150 identifies 335 a second set of candidate search results 240. The search results in the second set of candidate search results 240 represent a subset of search results in the first set of candidate search results 220. The online system 150 can provide 340 a query response to the client device 110 that includes indications of one or more search results from the second set of candidate search results 240.

Figure 3B:
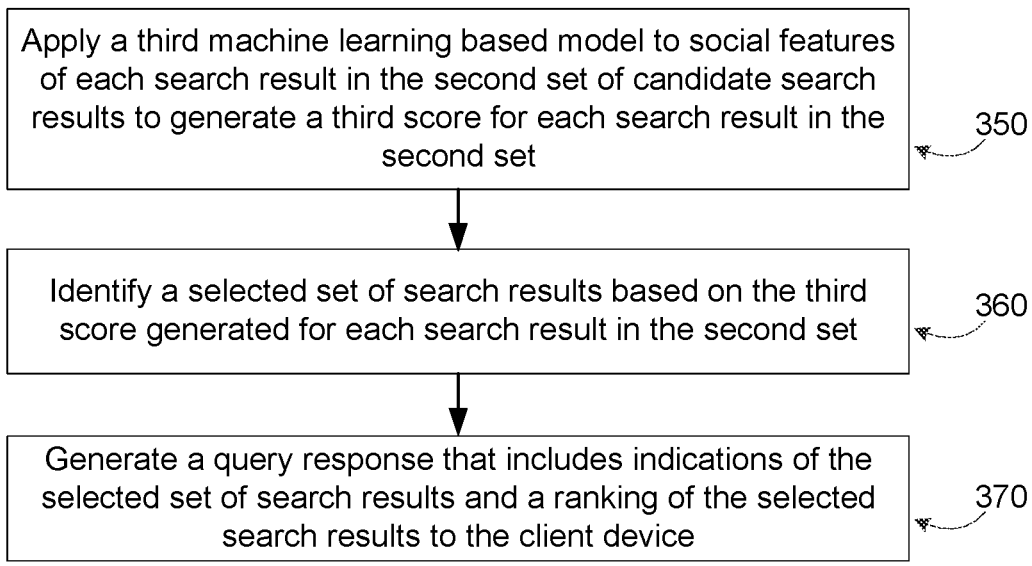
FIG. 3B depicts a flow process of applying a third machine learning model, in accordance with an embodiment.

In various embodiments, the online system 150 further analyzes the search results in the second set of candidate search results 240. Reference is made to FIG. 3B, which depicts a flow process 345 of further analysis conducted by the online system 150. Specifically, the online system 150 performs steps 350, 360, and 370 following the identification of the second set of candidate search results (e.g., step 335) and prior to providing the query response (e.g., step 340).

The online system 150 applies 350 a third machine learning based model, such as a level 3 model, to social features 255 of each search results in the second set of candidate search results 240. The third model outputs a third score for each search result in the second set of candidate search results 240. Based on the third score for each search result, the online system 150 identifies 360 selected search results 250 and a ranking of the selected search results 250. The online system 150 generates 370 a query response that includes indications of the selected search results 250 and the ranking of the selected search results 250. Therefore, the online system 150 can provide 340 the query response to the client device 110 such that the client device 110 can display the indications of the selected search results 250 in an order according to the ranking of the selected search results 250.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, from a client device, a search query comprising a search criteria and requesting documents matching the search criteria;
   identifying, by an enterprise search engine, a set of search results satisfying the search criteria specified in the search query;
   for each search result in the set of search results, providing, by a processor, a first machine learning based model with popularity features as input;
   for each search result in the set of search results, applying, by the processor, the first machine learning based model to generate a first score for the search result;
   identifying a first set of candidate search results as a subset of the set of search results, the subset determined by ranking the set of search results based on the first score generated by the first machine learning based model;
   for each search result in the first set of candidate search results, providing, by the processor, a second machine learning based model with query features describing the search query as input;
   for each search result in the first set of candidate search results, applying, by the processor, the second machine learning based model to generate a second score for the search result;
   identifying a second set of candidate search results as a subset of the first set of candidate search results, the subset determined by ranking the set of search results based on the second score generated by the second machine learning based model; and
   providing, to the client device, a query response comprising indications of one or more search results from the second set of candidate search results.

2. The method of claim 1, wherein applying the second machine learning based model consumes more resources of the processor in comparison to applying the first machine learning based model.

3. The method of claim 1, wherein the first machine learning based model is a linear model, wherein the first score generated by the first machine learning based model for a search result in the set of search results is a weighted aggregate of scores corresponding to popularity features.

4. The method of claim 1, wherein the second machine learning based model is one of a neural network, support vector machine, decision tree, learning classifier, or Bayesian network.

5. The method of claim 1, wherein identifying, by the enterprise search engine, the set of search results satisfying the search criteria specified in the search query, comprises:
generating a measure of similarity between a search result and the search query provided by the client device; and
selecting the search result to be included in the set of search results based on the generated measure of similarity being above a threshold value.

6. The method of claim 3, wherein the measure of similarity between the search result and the search query is a term frequency-inverse document frequency of a keyword specified in the search query.

7. The method of claim 1, wherein applying the second machine learning based model to generate the second score for the search result further comprises providing record content features of the search result as input to the second machine learning based model, and wherein the query features of the search query comprise a time and a user associated with the search query.

8. The method of claim 7, wherein applying the second machine learning based model to generate the second score for the search result further comprises providing a feature describing a rank of the search result in the first set of candidate search results as input to the second machine learning based model.

9. The method of claim 1, further comprising:
for each search result in the second set of candidate search results, applying, by a processor, a third machine learning based model to generate a third score for the search result; and
identifying a selected set of search results based on the third score generated for each search result in the second set of candidate search results,
wherein the indications of one or more search results in the query response are indications of search results in the selected set of search results.

10. The method of claim 1, wherein the application of the third machine learning based model consumes more resources of the processor in comparison to the application of the first machine learning based model.

11. The method of claim 9, wherein the third machine learning based model is applied to social features of a user associated with the client device that provided the search query to generate the third score for each search result in the second set of candidate search results.

12. The method of claim 1, further comprising retrieving the second machine learning based model based on an entity specified in the search query, wherein the second machine learning based model is previously trained using a training dataset provided by the entity.

13. The method of claim 1, wherein the first machine learning based model is applied to popularity features of search results in the set of search results in a parallel manner.

14. A non-transitory computer readable storage medium comprising instructions that, when executed by a processor, causes the processor to:
receive, from a client device, a search query comprising a search criteria and requesting documents matching the search criteria;
identify, by an enterprise search engine, a set of search results satisfying the search criteria specified in the search query;
for each search result in the set of search results, provide, by a processor, a first machine learning based model with popularity features as input;
for each search result in the set of search results, apply, by the processor, the first machine learning based model to generate a first score for the search result;
identify a first set of candidate search results as a subset of the set of search results, the subset determined by ranking the set of search results based on the first score generated by the first machine learning based model;
for each search result in the first set of candidate search results, provide, by the processor, a second machine learning based model with query features describing the search query as input;
for each search result in the first set of candidate search results, apply, by the processor, the second machine learning based model to generate a second score for the search result;
identify a second set of candidate search results as a subset of the first set of candidate search results, the subset determined by ranking the set of search results based on the second score generated by the second machine learning based model; and
provide, to the client device, a query response comprising indications of one or more search results from the second set of candidate search results.

15. The non-transitory computer readable medium of claim 14, wherein the instructions that cause the processor to apply the second machine learning based model consumes more resources of the processor in comparison to the instructions that cause the processor to apply the first machine learning based model.

16. The non-transitory computer readable medium of claim 14, wherein the instructions that, when executed by the processor, cause the processor to identify a set of search results that are relevant to the search query, the instructions that cause the processor to identify, by the enterprise search engine, the set of search results satisfying the search criteria specified in the search query further comprises instructions that, when executed by the processor, cause the processor to:
generate a measure of similarity between a search result and the search query provided by the client device; and
select the search result to be included in the set of search results based on the generated measure of similarity being above a threshold value.

17. The non-transitory computer readable storage medium of claim 14, wherein the instructions that cause the processor to apply the second machine learning based model to generate the second score further comprise instructions that, when executed by the processor, cause the processor to provide record content features of the search result as input to the second machine learning based model and wherein the query features of the search query comprise a time and a user associated with the search query.

18. The non-transitory computer readable storage medium of claim 14, further comprising instructions that, when executed by the processor, cause the processor to:
for each search result in the second set of candidate search results, apply, by a processor, a third machine learning based model to generate a third score for the search result; and
identify a selected set of search results based on the third score generated for each search result in the second set of candidate search results,
wherein the indications of one or more search results in the query response are indications of search results in the selected set of search results.

19. The non-transitory computer readable storage medium of claim 18, wherein the instructions that cause the processor to apply the third machine learning based model consumes more resources of the processor in comparison to the instructions that cause the processor to apply the first machine learning based model.

20. The non-transitory computer readable storage medium of claim 14, further comprising instructions that, when executed by the processor, cause the processor to retrieve the second machine learning based model based on an entity specified in the search query, wherein the second machine learning based model is previously trained using a training dataset provided by the entity.

* * * * *